Dec. 4, 1934.     C. M. SUNDSTROM     1,983,106
PACKLESS VALVE
Filed April 1, 1933
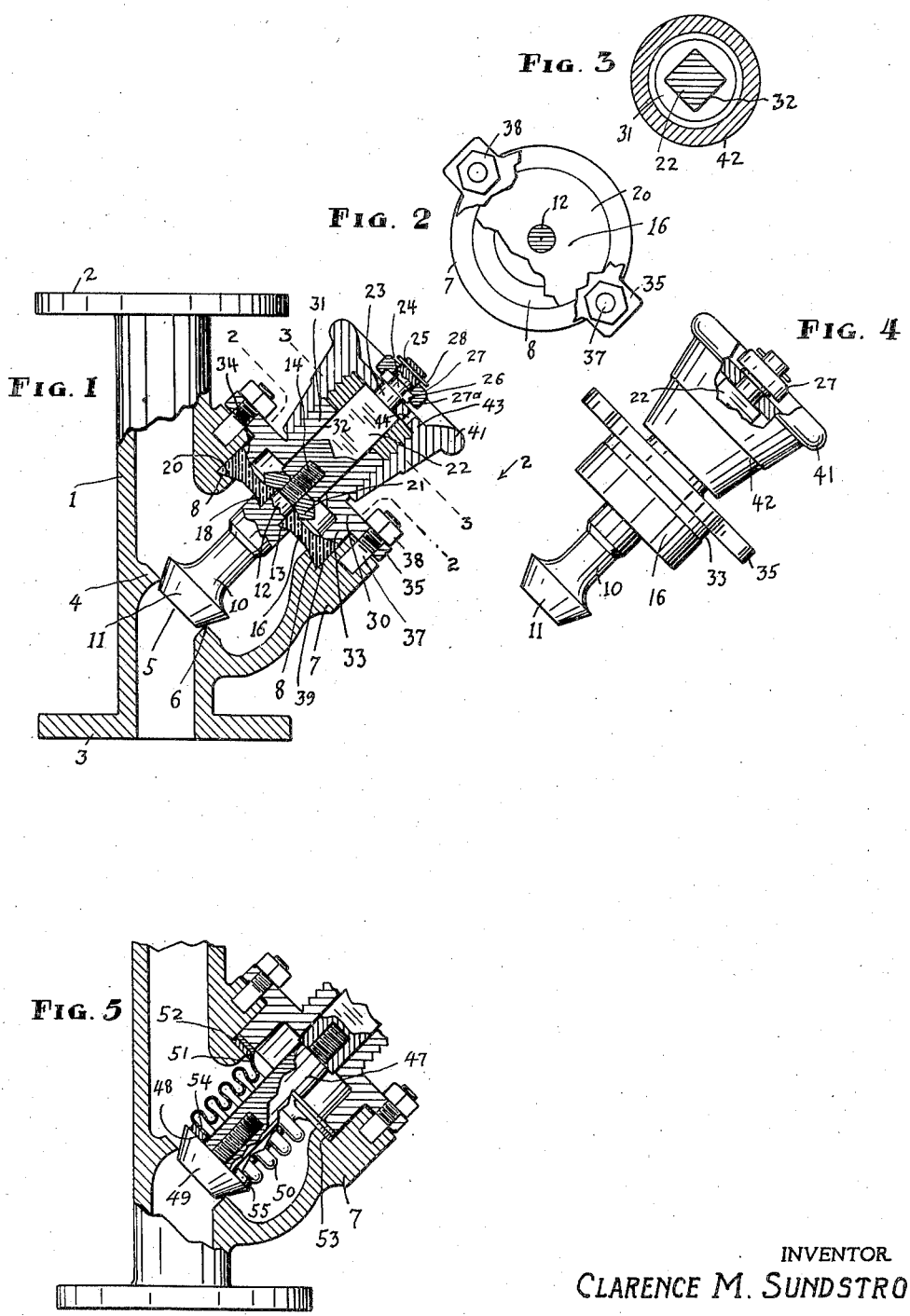
INVENTOR.
CLARENCE M. SUNDSTROM
BY
ATTORNEY.

Patented Dec. 4, 1934

1,983,106

UNITED STATES PATENT OFFICE 1,983,106

PACKLESS VALVE

Clarence M. Sundstrom, Montpelier, Ind.

Application April 1, 1933, Serial No. 663,989

2 Claims. (Cl. 251—31)

This invention relates to improvements in packless valves, and especially to a valve of this type intended for use with ammonia, steam, or water impregnated with alkali or sulphur properties, or with acid solutions or other fluids under high pressure, or low pressure.

The object of the present invention is to provide a valve of the kind referred to, that will be dependable in operation and durable, and which will be economical of construction and manufacture, and not liable to get out of order or repair. The above named general object, as well as more specific aims of the invention and which will become apparent as the specification of my invention proceeds, are accomplished by and the invention is embodied in the new combination, construction, and arrangement of parts described in the following specification and illustrated in the accompanying drawing. The invention is defined in the appended claims.

In the drawing—

Figure 1 is a vertical central sectional view of my invention in a preferred form of embodiment.

Figure 2 is a cross sectional top plan view taken on broken line 2—2 as seen in direction of the arrow 2 in Figure 1, the said broken line being dropped to the plane of the top of the closure member 16.

Figure 3 is a cross sectional top plan view taken on the line 3—3 in the direction of the arrow 2 in Figure 1.

Figure 4 is a side view of the valve assembly, removed from the valve body structure.

Figure 5 is a modification.

The invention, in its present embodiment, is shown as being especially applicable to a valve device of that type comprising a conventional hollow body structure having a partition therein and embodying an open neck portion, there being an opening provided in said partition, and which said opening is adapted to be closed by a valve member.

My invention proceeds upon the thought of providing, in combination with a valve member, a flexible elastic member united therewith and adapted to close the space between the neck and the head of the valve member, a head piece supported by said neck, a hand operable device on the said head piece, and connections between the head piece and the said valve member whereby with the hand operable device the valve member may be moved to and held in closed or open position, and to various positions with reference to the opening in said partition.

A structure of the kind referred to consists of a hollow tube-like body portion 1 with suitable end flanges 2 and 3, and the partition 4 which is provided with an opening 5 having annular seat 6. Formed integral with the open neck 7 of the said body portion 1, is an internal annular machined seat 8 which in cross section is beveled on an inclined downwardly from the axial center of said neck. A valve member 10 which has the integrally formed coned head 11 is provided with a central stud 12 at whose base is annular shoulder 13 which in cross section is beveled at an incline upwardly from the axial center thereof.

Integral with the said stud is threaded stem 14.

A member to close the space between the valve member and the neck portion 7 of the body structure, consists of a disk 16 made of rubber or other elastic flexible non-porous material impervious to moisture or gases. This disk has a central perforation whereby it may be disposed upon the stud 12. Upon each side of said disk and immediately at said perforation are the outwardly beveled lips 18. The peripheral portion of said disk is of such formation in cross section as to constitute outwardly beveled opposed lips 20. Loose on said stem 14 is a grip ring 21 whose lower face, in cross section, is downwardly inclined from the axial center of said stem. An extension member 22 which is square in cross section and is provided with a threaded central bore is screwed to tightened position on the stem 14, being thereby united with the said valve member 10 and at the same time pressing the said grip ring 21 to and holding it in clamping engagement with the lips 18 of the disk 16 thereby constituting a sealed union between the closure disk and the said valve member. Integral with the outer end of the said extension member 22 is a pintle 23 which is provided with annular groove 24 and a transverse perforation 25, the functions of which will be presently referred to.

A head piece 30 embodies a central boss 31 which is externally threaded. It has a broached central opening 32 which is angular in cross section and it constitutes a guideway for the extension member 22 of the said valve member. The lower circular portion of said head piece, designated as annular shoulder 33, is of diameter to be disposed freely in the bore of the said neck 7. The machined face 34 of said annular shoulder is beveled in cross section, at an incline downwardly toward the axial center of the valve member.

Suitable holes which are provided in the flanges 35 of said head piece, are in registration with threaded studs 37 that are provided at the top face of the neck 7. By nuts 38 the said head piece is drawn downwardly, the shoulder 33 compressing the rim portion of the resilient disk 16 to sealed union with the seat 8 and the bore 39 of the said neck 7.

It will be observed that the longitudinal dimension of the valve member 10 is such, that when the coned head 11 is at the seat 6, the plane of the disk 16 is at a right angle to the axial center of said valve member, as plainly shown in Figure 1.

A hand wheel 41 has hollow hub portion 42 in threaded external engagement with the boss 31 of the said head piece 30. Centrally of the transverse web 43 of said hand wheel is a hole which is slightly larger in diameter than the diameter of pintle 23 whereby when the hand wheel is screwed down to position, the said web will have been brought into engagement with the end of said extension member 22. The half portions of a divided ring 26 are then lain in the groove. A retainer ring 27 whose annular bottom flange 27a retains the said divided ring 26 is, in turn, retained by a cotter pin 28 which is inserted through the perforation 25 therefor. Lubricant may be applied at a hole 44 provided therefor through the web 43 of the wheel.

By my invention there is provided a valve mechanism proper, in the form of a unitary assembly, as shown in Figure 4. It is capable of being easily disposed and secured in place, and as easily removed. It lends itself to the application of disks of various types and compositions in accordance with such special duty as may be imposed. Also it lends itself readily to modifications in dimensions, there being no changes in the principle of operation due to size or capacity, the essential characteristics with regard to processing, and with regard to practicing the invention, being unchanged. Whereas I have shown the extension member 22 as being square in cross section for the purpose of providing suitable guideway surfaces, and also for the purpose of the retention against rotative movement, it is obvious that modification may be made in this respect. The only processing on the body structure 1 other than the usual facing off of the flanges 2 and 3 is the machining of the annular neck seat 8 and the seat 6 of the valve opening 5.

Another important advantage afforded by my invention is that there is practicable the economical and effective treatment of the interior surfaces of the body structure, such as by electro-plating or enameling, to render same impervious to chemical reactions to which the interior surfaces of the body structure are subject. With the closure member 16 held at its central portion in sealed union with the valve member, and held at its circumferential portion in sealed union with the neck 7, the body structure is hermetically sealed. With the hand wheel turned clockwise to the position as shown in Figure 1, the coned head 11 is at closed position. By turning the hand wheel anti-clockwise, the web 43, bearing against the ring 26, causes the valve member 10 to be raised, the extension 22 moving slidingly in the guideway 32 and the coned head accordingly being moved to open position. The relatively slight strain imposed upon the elastic disk is negligible, and a valve mechanism constructed in accordance with my invention is durable, dependable, and not liable to become deranged or out of order.

In instances where it may be desirable to use a closure member of metallic composition, the invention may be of the modified form as shown in Figure 5. In this modification the valve member 47, at its lower end, is provided with a seat 48 at the rear of the coned head 49. The closure member consists of a cylindrical metal bellows 50. A flange 51 at the upper end of the bellows is reposed on a seating ring 52 that rests on internal annular seat 53 of the neck 7; and an internal flange 54 at the lower end of the bellows is reposed on a seating ring 55 that rests on the seat 48 of the said valve member.

Whereas I have shown and described the features of my invention in the order, form, and construction deemed preferable, it will be understood that minor changes may be made, within the scope of the invention as same is defined in the appended claims, without departing from the spirit or principle of the invention.

What I claim as my invention, is—

1. In a valve structure of the kind described, a valve mechanism comprising a valve member having a coned head and provided with a central stud at whose base is an annular shoulder which in cross section is beveled at an incline upwardly from the axial center thereof, and the said stud having a threaded stem, a flexible impermeable disk with central perforation to engage said stud, the portions of said disk immediately at said perforation, and at the periphery of said disk, having opposed outwardly beveled lips, a grip ring loose on said stem and whose lower face in cross section is beveled downwardly from the axial center of said stem, an extension member square in cross section and provided with a central bore in which the threaded stem is received, and there being a pintle at its outer end, a head piece having an externally threaded central boss provided with a broached central opening in which the said extension member is received, and having a lower circular portion having an annular shoulder with lower face beveled in cross section downwardly toward the axial center of the valve member for engaging the periphery of the disk, and a hand wheel having a transverse portion, and a hollow hub portion the latter being internally threaded to engage the boss of said head piece, there being a central aperture in said transverse portion to receive the pintle of said extension member, and means to retain the extension member in engagement with said wheel, substantially as shown and described.

2. A valve mechanism of the kind described, comprising a tubular body structure with a partition therein at an oblique angle to the bore thereof and provided with an opening in said partition which is of diameter substantially the same as that of the bore of the said body structure, and the said body structure embodying a neck portion immediately adjacent to said partition opening and which is provided with an internal annular seat the plane of which is parallel with the plane of said partition opening, a valve member having a central threaded axial stud, and being provided with a head to engage the wall surrounding said partition opening, an elastic sealing member between the head of said valve member and the said annular seat, a head piece to secure the border portion of said sealing member to said annular seat, an extension member angular in cross section, provided with a central bore in which the threaded stud is received, and having a pintle at its outer end, said head piece having a central broached opening in which said extension member is received and having a lower circular portion to engage the said neck, a hand wheel threaded on said head piece, having a transverse portion, there being a central aperture in said transverse portion to receive the pintle of the extension member, and means to retain the extension member in engagement with said hand wheel.

CLARENCE M. SUNDSTROM.